United States Patent [19]

Beauchet

[11] 4,343,072
[45] Aug. 10, 1982

[54] METHOD OF MANUFACTURING COMPOSITE RINGS FOR BEARINGS

[75] Inventor: Jean Beauchet, Veyrier du Lac, France

[73] Assignee: Societe Nouvelle de Roulements, Annecy, France

[21] Appl. No.: 78,453

[22] Filed: Sep. 24, 1979

[30] Foreign Application Priority Data

Sep. 25, 1978 [FR] France .................. 78 27347

[51] Int. Cl.³ ............................................ B21D 53/10
[52] U.S. Cl. .................... 29/149.5 DP; 29/149.5 PM; 29/420; 29/420.5
[58] Field of Search .................. 75/200; 29/149.5 DP, 29/149.5 PM, 149.5 C, 149.5 S, 148.4 R, 420.5, 420

[56] References Cited

U.S. PATENT DOCUMENTS

| | | | |
|---|---|---|---|
| 1,677,841 | 7/1928 | Nice | 29/148.4 R |
| 1,703,177 | 2/1929 | Short | 29/149.5 PM |
| 1,797,752 | 3/1931 | Blackmore | 29/149.5 PM |
| 1,942,578 | 1/1934 | Stockfleth | 29/149.5 DP |
| 2,198,253 | 4/1940 | Koehring | 29/149.5 X |
| 2,457,861 | 1/1949 | Brassert | 75/200 |
| 2,747,256 | 5/1956 | Wyatt et al. | 29/420.5 X |
| 2,913,811 | 11/1959 | Benson | 29/148.4 R |
| 3,332,774 | 7/1967 | Tuttle | 29/149.5 PM |
| 3,834,003 | 9/1974 | Nayar | 29/420.5 |

FOREIGN PATENT DOCUMENTS 459923 3/1979 U.S.S.R. .................. 29/148.4 R

Primary Examiner—Francis S. Husar
Assistant Examiner—V. K. Rising
Attorney, Agent, or Firm—Fleit & Jacobson

[57] ABSTRACT

This method of manufacturing composite rings for rolling-contact bearings comprises the steps of making a composite ring from a blank of bearing steel sheet and a circular rough-shaped steel body obtained by compressing a same or different steel grade used in a granular, spheroidal, pulverulent or fibrous form, by means of a sintering, forging and/or rolling operation, the final product having the sheet portion disposed in the operative area of the ring.

8 Claims, 18 Drawing Figures

METHOD OF MANUFACTURING COMPOSITE RINGS FOR BEARINGS

BACKGROUND OF THE INVENTION

1. Field of the Invention

This invention relates in general to rolling-contact bearings and has specific reference to a method of manufacturing composite rings for such bearings, wherein the ring body material differs from the material constituting the operative portion of the bearing, that is, the race.

2. Description of the Prior Art

A method of manufacturing a composite ring for rolling-contact bearings, which comprises a ring body of current metal grade that is, a medium quality metal commonly used in die forming, and a race consisting of a sleeve of high-grade metal, is already known in the art.

The component elements of the ring, consisting both of sintered steel powder, are compressed separately and then fitted to each other, the resulting assembly being subsequently sintered, after assembling the elements, and finally hot forged.

SUMMARY OF THE INVENTION

This invention is based on the concept of improving the mechanical properties of composite bearings wherein the operative portion of the bearing ring, namely the race, consists of a high-grade metallurgical material obtained through a smelting process followed by a rolling operation in order to produce a metal sheet in which a blank is cut. This blank is used for producing the bearing race. The blank is positioned on a rough-shaped compact cylindrical ring body of particulate material to form an assembly that is compressed or compacted to obtain a rough-shaped bearing ring. The bearing ring is subsequently sintered in a furnace containing a non-oxidizing atmosphere. The bearing means is then formed during a subsequent forging and/or rolling operation.

During the compacting operation, the steel blank is bonded to the rough-shaped cylindrical body by mere compression.

With this method it is possible, without detrimentally affecting the properties of the final product, to use particulate or divided steel in various commercially available forms for making the rough-shaped ring body. The nature or grade of this steel stock may be consistent with the specific properties contemplated for the bearing ring, whereby it will be possible to drill or tap the ring subsequent to the heat treatment.

The thickness of the race material proper will of course be subordinate to the initial thickness of the metal blank and also to the specific characteristics of the tool means implemented.

DESCRIPTION OF THE PREFERRED EMBODIMENTS

Figure 1:
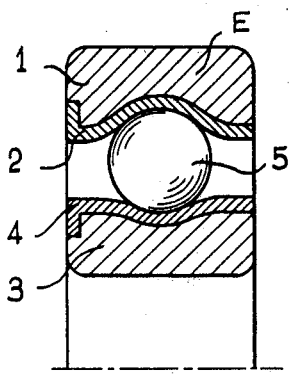
FIGS. 1 and 2 illustrate in radial section outer and inner rings of composite rolling-contact bearings, according to this invention.
Figure 2:
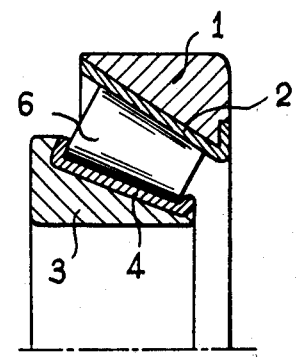

Referring first to FIGS. 1 and 2 of the drawings, the outer and inner rings of the rolling-contact bearings shown therein comprise a ring body 1, 3, respectively, and a steel sheet lining 2, 4 respectively, the latter providing the races for engagement with the rolling members consisting, for example of balls 5 or rollers 6, as shown.

Figure 3:
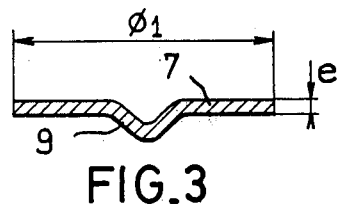
FIGS. 3 and 4 illustrate in cross-section two different forms of embodiment of the blank subsequent to the shaping thereof.
Figure 4:
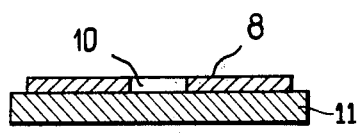

As illustrated in FIGS. 3 and 4, in the method of this invention for manufacturing a bearing ring having an outer diameter not in excess of 80 or 100 mm, a sheet metal blank 7 consisting of bearing steel, more particularly 52100 grade steel as per the American Standard SAE J 404, is used.

The sheet metal blank 7 having a diameter $\phi_1$ is obtained by cutting and stamping from steel strip stock. A particulate or divided material in the form spheroidal, granular, pulverulent, or fibre steel particles, compressed to constitute a cylindrical rough-shaped body having a diameter greater than $\phi_1$, is associated with said blank 7.

This rough-shaped body can be formed from particulate or divided steel containing a number of impurities such as oxides and abrasive residues. The body 11, when associated with the blank 7, forms an assembly that is shaped by compressing in a press, under pressures ranging from 20 to 100 kg/sg.mm., according to the temperature (from about 300° C. to about 700° C.) whereat the blank and the metal particles are heated.

The blank 7 or 8 (FIG. 3 or 4) is positioned on a body 11 of particulate material either by means of a central conical projection 9 as illustrated in FIG. 3, or by means of a central hole 10 as illustrated in FIG. 4.

Figure 11:
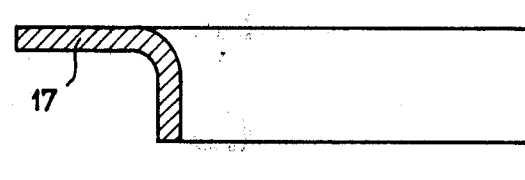
FIG. 11 is a radial sectional view of a steel blank intended for manufacturing a ring of relatively great diameter.
Figure 12:
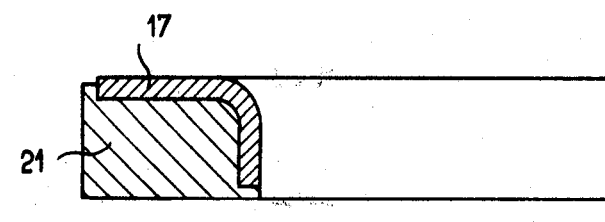
FIG. 12 is a view similar to FIG. 11, showing a compacted rough-shaped steel body with the steel race blank fitted thereon, for producing a large-diameter ring.

In the case of rings having a diameter in excess of 80 to 100 mm, the blank is in the form of an annular ring 17 having an axial cylindrical concentric central projection, as shown in FIG. 11. As already mentioned hereinabove, a rough-shaped bearing ring is formed by compressing the assembly comprising the annular blank 17 and an annular body 21 of particulate steel, in order to obtain a composite ring as shown in FIG. 12. According to the dimension of the final bearing ring, the cylindrical assembly 7, 11 or 17, 21 is subsequently sintered in a furnace containing a non-oxidizing atmosphere consisting of hydrogenated nitrogen at a temperature within the range of 1,100° to 1,200° C. The product emerging from the furnace is passed through a slow-cooling tunnel protected from oxidation to reduce the temperature of the sintered rough-shaped assemblies to about 950° to 1,000° C.

Figure 5:
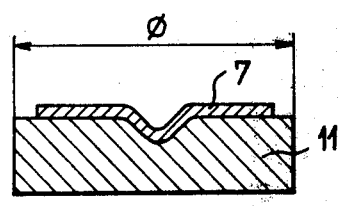
FIG. 5 is a section taken across the compacted steel rough-shaped body (in pulverulent, fibrous granular or spheroidal form), with the race blank positioned thereon.

At a temperature of 950° to 1,000° C. and still in a non-oxidizing atmosphere, a combined drawing and density-increasing operation is carried out. This operation is applicable to bearing rings of relatively small diameter obtained from cylindrical assemblies of the type illustrated in FIG. 5, and also to bearing rings of relatively large diameter obtained from an annular composite body of the type illustrated in FIG. 12.

Figure 6:
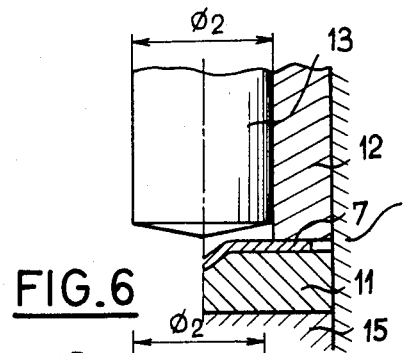
FIG. 6 is a radial longitudinal section showing the forging die before the downward stroke of the press punches.
Figure 7:
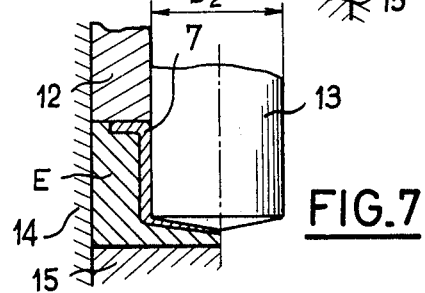
FIG. 7 is a view similar to FIG. 6 but showing the forging die after the press punches have completed their downward stroke.

The composite rough-shaped assembly 7, 11 is positioned in a die 14 on top of die member 15, the steel blank 7 being held in position by a hold-down ring 12 (FIGS. 6 and 7).

Figure 8:
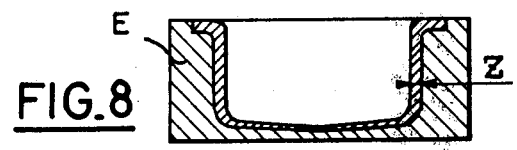
FIG. 8 is a diametral section showing the bearing ring thus obtained.
Figure 9:
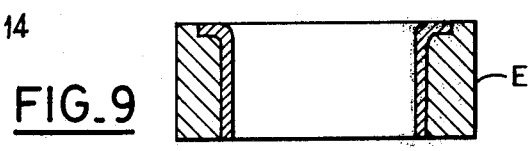
FIG. 9 illustrates also in diametral section the same ring after the break-through step.
Figure 10:
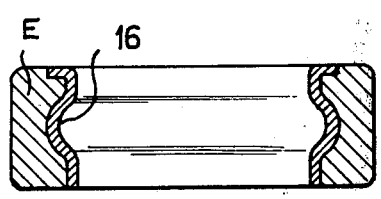
FIG. 10 is another dimetral section showing the same ring after the rolling operation.

Die member 25 supports annular body 21 and guides movement of punch 23. Then the forming punch 13, to which a predetermined force is applied, will press and die form the materials of the rough-shaped body and blank 7 while increasing their density, the sheet-metal blank 7 being thus shaped and distributed along the inner surface of the resultant ring E as shown in FIG. 8, the blank thickness Z depending on the initial thickness e (FIG. 3). Then, it is only necessary to break through and bevel the ring E to obtain the assembly illustrated in FIG. 9. A rolling operation or a precision forging operation is then accomplished (FIG. 10) according to the known technique for forming the race 16. In the case of rings having a relatively great diameter (>80 to 100 mm), the operations are substantially similar.

Figure 13:
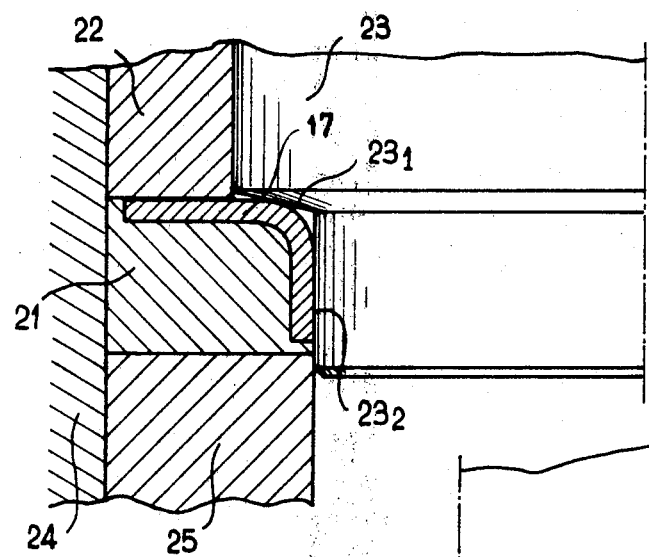
FIG. 13 is another radial section showing the component elements of a forging die.
Figure 14:
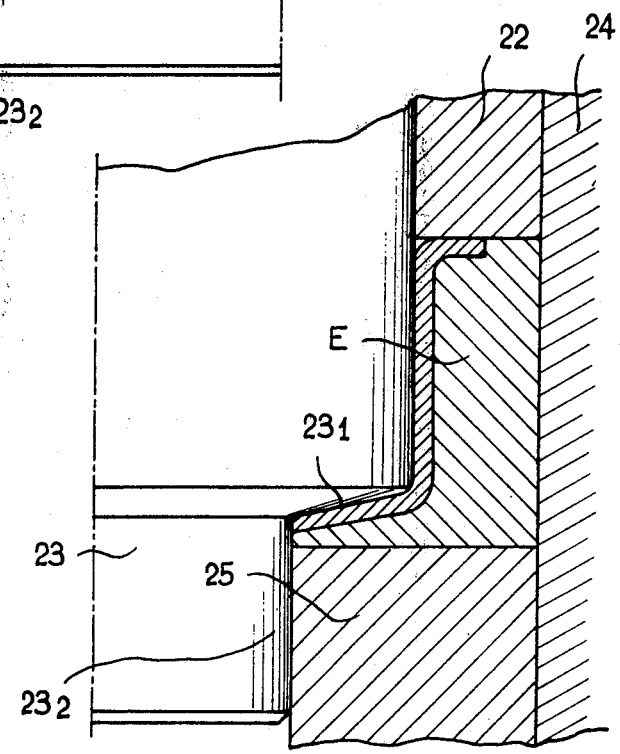
FIG. 14 is a radial section showing the same forging die elements after the press punches have completed their downward or operative stroke.

After the sintering operation the annular rough-shaped ring 17, 21 (FIG. 12), is positioned in a die 24 on top of die member 25 (FIG. 13), member 22 holding the blank 17 in position. Die member 25 supports annular body 21 and guides movement of punch 23. The extrusion punch 23 comprises a shouldered portion $23_1$, $23_2$ so that the blank material can be drawn between the punch body and the die 24 as a consequence of the axial stroke of said punch (FIG. 14).

It is clear that the above-described drawing steps correspond to the operations described in connection with the manufacture of bearing rings having an outer diameter not in excess of 80 to 100 mm.

Figure 15:
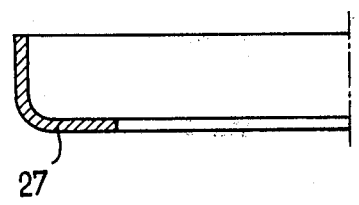
FIG. 15 is a radial section showing the steel blank for making an inner ring of rolling-contact bearing.
Figure 16:
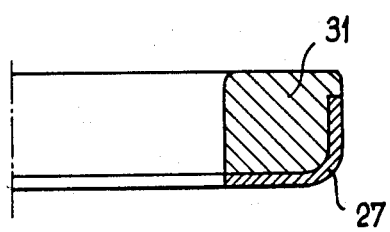
FIG. 16 illustrates a compacted rough-shaped body associated with a steel blank for making an inner ring of rolling-contact bearing.
Figure 17:
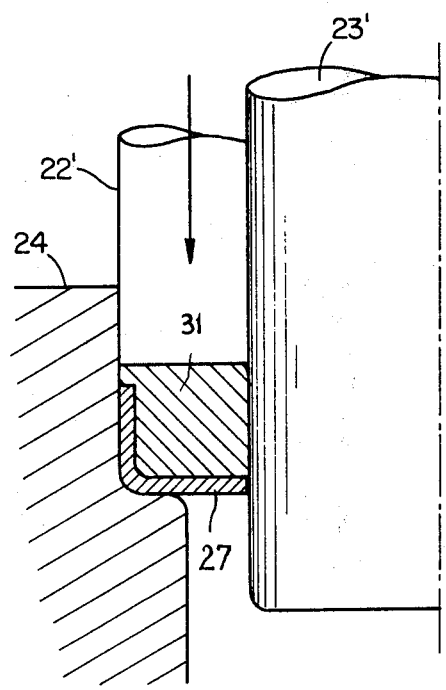
FIGS. 17 and 18 are two radial sections showing the forging die before and after the press punch has completed its downward stroke for shaping an inner ring.
Figure 18:
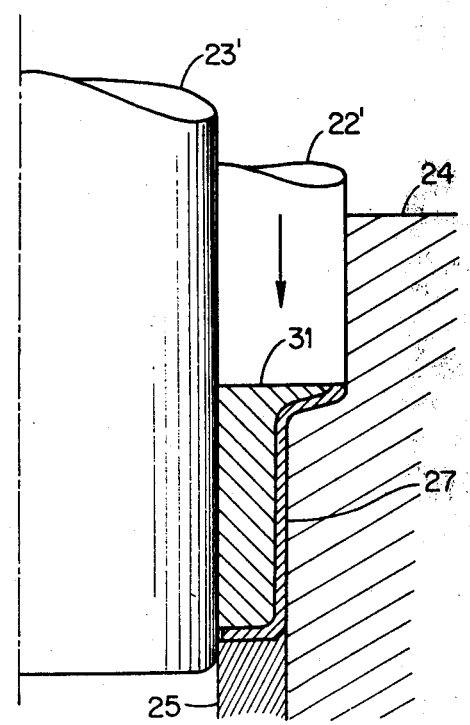

Of course, the manufacture of inner rings is similar to that described in connection with outer rings. As in the case of outer rings of relatively great diameter >80 to 100 mm), the blank 27 is pre-shaped (FIG. 15) to obtain a composite blank 27, 31 comprising a compacted steel body 31 and a steel sheet blank 27, which after the sintering operation is drawn as in the preceding example (FIGS. 17 and 18). More particularly, the composite blank 27, 31 is positioned in a die 24, with members 22' and 23' holding the composite blank in position. Movement of the members 22' and 23' then shapes the steel body 31 by drawing between the member 23' and the steel sheet blank 27. Further, the density of the steel sheet blank 27 is increased by the interaction between the die 24 and the members 22' and 23', and the blank 27 is shaped by interaction between the members 22', 23', 24, and 25.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed is:

1. A process of forming a composite ring consisting of a particulate material portion on which is secured a sintered steel sheet portion, comprising:

positioning a sheet metal blank on a particulate steel material in the form of a cylindrical rough shaped body;

compressing said sheet metal blank together with the particulate steel material under pressure ranging from 20 to 100 Kg/mm$^2$ at a first temperature ranging from 300° to 700° C.;

sintering said compressed sheet metal blank and particulate steel material at a second temperature ranging from 1100° to 1200° C. to form an assembly;

cooling the assembly to a third temperature ranging from 950° to 1000° C;

positioning the assembly in a die and contacting the assembly with a blank hold-down member so that the assembly is held in position; and introducing a punch into the die and assembly to perform a combined drawing and density increasing operation by press and die forming the assembly, the punch operating through the hold-down member and penetrating into the assembly and cooperating with the die to shape the particulate steel material to the shape of the particulate material portion of the composite ring and to increase the density of the sheet metal blank portion thereby forming the sintered steel sheet portion of the composite ring.

2. A process according to claim 1, wherein said sheet metal blank portion and particulate steel material assembly is shaped to a ring configuration, the press and die forming being accomplished with the assistance of said blank hold-down member causing the sheet metal blank portion to be drawn between the die and the outer surface of the ring of which the density has been increased by the press and die forming for producing an outer ring of a rolling-contact bearing.

3. A process according to claim 1, wherein said sheet metal blank portion and particulate steel material assembly is shaped to a ring configuration, the press and die forming being accomplished with the assistance of said blank hold-down member causing the sheet metal blank portion to be drawn between the die and the inner surface of the ring of which the density has been increased by the press and die forming for producing an inner ring of a rolling-contact bearing.

4. A process as claimed in claim 2, wherein the race of the ring which is to be engaged by the rolling elements of the rolling-contact bearing is given its final configuration by forging, immediately after the density-increasing operation.

5. A process as claimed in claim 2, wherein the race of the ring which is to be engaged by the rolling elements of the rolling-contact bearing is given its final configuration by rolling, immediately after the density-increasing operation.

6. A process as claimed in claim 3, wherein the race of the ring which is to be engaged by the rolling elements of the rolling-contact bearing is given its final configuration by forging, immediately after the density increasing operation.

7. A process as claimed in claim 3, wherein the race of the ring which is to be engaged by the rolling elements of the rolling-contact bearing is given its final configuration by rolling, immediately after the density increasing operation.

8. A process according to claim 1, 2, or 3, wherein said drawing and density increasing operation is performed at the third temperature.

* * * * *